United States Patent Office — 2,992,243 — Patented July 11, 1961

2,992,243
3-KETO-17-HYDROXY-COMPOUNDS OF ETIOCHOLANE AND ANDROSTANE AND METHOD FOR THEIR MANUFACTURE

Alberto Ercoli, Milan, Italy, assignor to Francesco Vismara S.p.A., Casatenovo (Como), Italy, a corporation of Italy
No Drawing. Filed June 22, 1960, Ser. No. 37,845
Claims priority, application France June 25, 1959
10 Claims. (Cl. 260—397.4)

This invention relates to a method for converting a 3,20-diketo-pregnane or allo-pregnane into a corresponding 3-keto-17-hydroxy etiocholane or androstane and to the novel intermediates produced in said conversion.

It is known that a 20-ketopregnane may be converted into a 17-acetoxy-etiocholane by means of an oxidation agent such as perbenzoic acid. The reaction will proceed easily when the starting product does not contain any functional groups liable to be affected by the oxidizing agent, such as a 20-keto-steroid free of substitutions at the 3-position. The conversion is still able to progress readily enough if the starting material does contain a hydroxyl group at 3-position, provided care is taken first to protect this material by acetylation.

If however the starting substance contains a 3-keto group, oxidation with perbenzoic acid, instead of involving the side chain, will occur on the ring A, thus introducing an oxygen atom in one of the positions adjacent to the 3-keto group and resulting in the subsequent formation of a lactone nucleus, as demonstrated by Burckhardt and Reichstein (cf. Helv. Chim. Acta 25, 1434, 1942).

The presence of a carbonyl group at 3-position therefore does not permit a 3,20-diketosteroid of the pregnane series to be converted into the corresponding 3-keto-17-acetoxy derivative of the etiocholane series.

It is an object of the present invention to provide a method for carrying out said above conversion.

Another object of this invention is to provide new intermediates viz. 3-hydroxy-3-cyano-20-keto 5α or 5β-pregnanes which can be used for the production of a 3-keto-17-hydroxy compound of the etiocholane or androstane series.

It has been found that when a 3,20-diketo pregnane or allopregnane is converted in the corresponding 3-monocyanohydrin prior to the oxidation step, only the 17-position is activated and hence attacked by the oxidizing agent. During this treatment an oxygen atom is introduced selectively between the 17 and 20 positions, thereby yielding the cyanohydrin of a 3-keto-17-acetoxy etiocholane or androstane. The oxidation step carried out with a peracid does not involve the 3-carbonyl group thus protected, since the monocyanohydrin is stable in acidic medium. Other carbonyl protecting groups, such as an enolether or a glycol ketal, are not suitable for this operation.

The method of the present invention therefore consists, basically, in reacting, under suitable conditions, a 3,20-diketosteroid with acetone-cyanohydrin in order to block temporarily and exclusively the 3-keto group in the form of cyanohydrin, then exposing the new intermediate product to the action of an appropriate oxidizing agent thereby forming the corresponding cyanohydrin of a 3-keto-17-acetoxy-etiocholane or androstane, and finally saponifying, if and as required, in a basic or acidic medium.

The process of the present invention and the novel compounds produced therein may be represented by the following sequence of reactions:

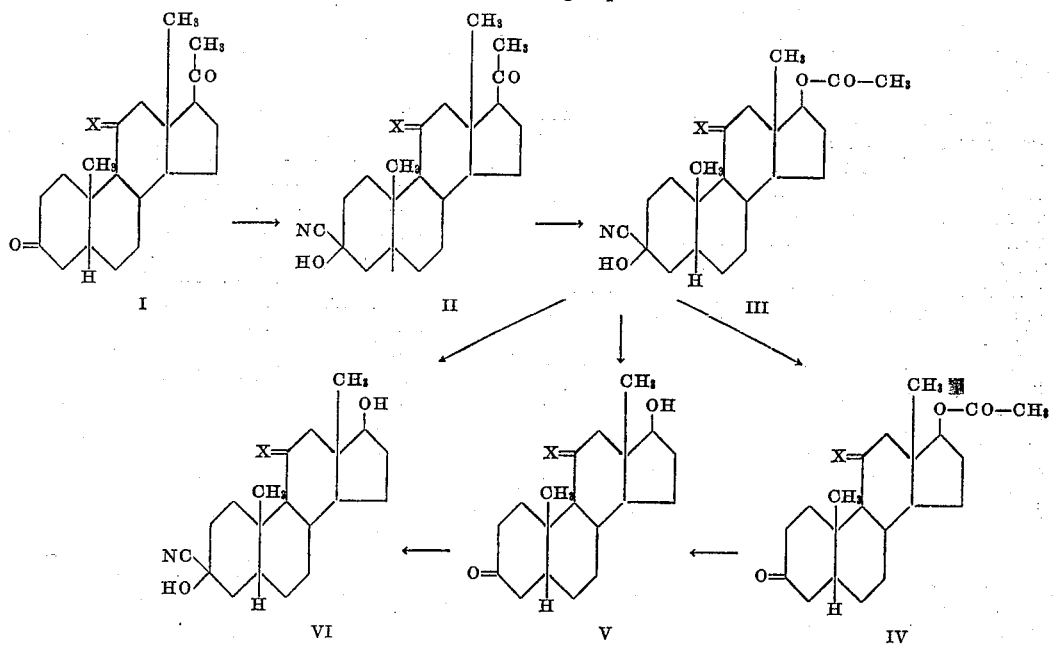

where X represents two hydrogen atoms or a ketonic oxygen or an α or β-hydroxy group, and the hydrogen at the 5-position has either the normal (β-pregnane) or the allo configuration (α-pregnane).

The reaction sequence may be accomplished either with or without isolation of the intermediates.

In performing the process, the starting material is treated with acetone-cyanohydrin in solution of a suitable diluent and in the presence of a basic catalyst. Suitable diluents are alcohols, specially methanol or ethanol. As basic catalysts various organic bases may be used including pyridine, alkylamines, such as ethanolamine, dimethylamine, triethylamine, this latter being preferred. Ammonia or alkali metal cyanides, or alkaline hydroxides can be also used. The exchange reaction between the acetone-cyanohydrin and the 3,20-diketosteroid, performed in an alcohol diluent, yields exclusively a 3-monocyanohydrin which is a mixture of two epimers, viz. 3α-cyan-3β-hydroxy-20-keto-pregnane or -allopregnane, and 3β-cyan-3α-hydroxy-20-keto-pregnane or -allopregnane, represented by the Formula II. (If the above reaction is carried out in the absence of an alcohol, formation of a 3,20-dicyanohydrin also occurs).

The 3-monocyanohydrin of 3,20-diketosteroid is then exposed to an appropriate oxidizing agent which may be a peracid, such as peracetic acid, prebenzoic acid or perphthalic acid, or even hydrogen peroxide. Best conditions are achieved when the 3-monocyanohydrin is treated with the oxidizing agent in the solution of a suitable organic solvent such as chloroform, ether, dioxan and the like. The oxidizing agent may be added in one or more steps, successively, in an excess amount over the stoichiometrical one. The mixture, allowed to stand at room temperature (from about 0° to about 30° C.) for several days, gives in good yield the corresponding 3-cyanohydrin of 17-acetoxy-3-keto-etiocholane (or androstane) (Formula III). This compound can be isolated and identified or directly saponified under suitable conditions according to the desired final product.

If the hydrolysis is performed in a slightly alkaline medium, e.g. by treating the 3-cyanohydrin of 17-acetoxy-3-keto-etiocholane (or androstane) with pyridine, elimination of hydrogen cyanide occurs with restoration of the starting 3-keto group thus obtaining 17-acetoxy, 3-keto-etiocholane (or androstane) (Formula IV).

When hydrolysis is carried out in a substantially alkaline medium, e.g. with an alkaline hydroxide or carbonate in an alcoholic solution, simultaneous elimination of the hydrogen cyanide is obtained together with hydrolysis of the acetoxy group at the 17-position, thus obtaining a 3-keto 17-hydroxy-etiocholane or androstane (Formula V).

In view of the high stability of the cyanohydrin in an acid medium, the treatment may be performed with a dilute inorganic acid in order to cause hydrolysis of the ester group only and formation of the corresponding cyanohydrin of 3-keto-17-hydroxy-etiocholane (or -androstane) (Formula VI). This product which contains a protected 3-keto group may be advantageously used for further reactions involving either the hydroxyl group at the 17-position, or the keto group, if any, present at 11-position.

The method of the invention can be applied not only to compounds having the general Formula I, but also to 3,20-diketo-steroids containing in their molecules other substituents such as methyl groups, halogen atoms and/or hydroxyl groups suitably protected.

In order that the invention may be well understood the following examples are given by way of illustration only.

*Example 1*

One gram of allopregnane-3,20-dione, partially dissolved in 25 cc. of hot ethanol was treated with 3 cc. of a mixture of acetone-cyanohydrin containing a drop of triethylamine, whereby a complete solution was obtained within a few minutes. The reaction mixture was allowed to stand for five–six hours at room temperature (from about 10° to about 25° C.). It was then diluted with water slightly acidified with acetic acid and was subjected to ether extraction. The combined ether extracts were washed with water and dried in vacuo at low temperature. The residue, taken up with hexane, gave allopregnandione-3-monocyanohydrin with practically a quantitative yield; the product, after trituration with ether, showed melting point 184–186° C.

500 mg. of the 3-monocyanohydrin thus obtained was treated with 3 cc. of a chloroform solution containing 8% perbenzoic acid, and the mixture was maintained at about 20° C. for 3 days. After further addition of 3 cc. of the chloroform solution of perbenzoic acid, the reaction mixture was allowed to stand again for four days at the temperature of about 20° C. Then it was washed with sodium bicarbonate solution and rinsed with water and was concentrated in vacuo.

The residue, taken up with an ether-hexane mixture, yielded the 3-cyanohydrin of androstan-17-ol-3-one acetate, melting point 174–178° C. On recrystallization from ethyl acetate the product showed a melting point of 178–180° C.

After oxidation, if a sodium hydroxide solution is used instead of the sodium bicarbonate solution mentioned above in washing the reaction mixture, androstanolone acetate may be obtained directly.

The conversion of the 3-cyanohydrin of androstanolone acetate into free androstanolone has been performed in the following way:

500 mg. of the cyanohydrin as obtained above was dissolved in 10 cc. of a 5% solution of potassium hydroxide in methanol, and the resulting solution was heated for half an hour on a water bath. After cooling, the reaction mixture was diluted with water and the product which precipitated collected on filter. Androstan-17-ol-3-one was obtained, at melting point 170–175° C. A recrystallization from methanol yields a pure product melting at 176–178° C.

If the above operation is carried out with a dilute mineral acid, instead of in alkaline medium, a hydrolysis of the ester occurs, thus obtaining the 3-cyanohydrin of the corresponding free androstanolone.

*Example 2*

One gram of 3,20-pregnandione dissolved in 10 cc. of ethanol was treated with a mixture of 3 cc. acetone-cyanohydrin and one drop of triethylamine. After six hours at room temperature, the same procedure was followed as in Example 1. There was thus obtained the 3-monocyanohydrin of 3,20-pregnandione which, after trituration with a mixture of ether and petroleum ether, showed a melting point 165–167° C. One gram of the resulting 3-monocyanohydrin, dissolved in 5 cc. of chloroform was treated with 6 cc. of an ether solution containing 800 mg. of monoperphthalic acid. The reaction mixture was allowed to stand for 15 days at 0° C., then washed with sodium bicarbonate solution and rinsed with water until neutral. After drying over anhydrous sodium sulfate and concentration in vacuo, an oily residue was obtained consisting of 17β-acetoxy-3-ketoetiocholane-cyanohydrin. 500 mg. of the oily residue, as previously obtained, were dissolved in a mixture of 4 cc. pyridine and 1 cc. water and the solution was heated for half an hour on a boiling water bath. On dilution, 17β-acetoxy-3-keto-etiocholane separated off and, after recrystallization from methanol, showed melting point 144–146° C.; $[\alpha]_D = +26 \pm 1 (CHCl_3)$.

A further 500 mg. of the oily cyanohydrin of 17β-acetoxy-3-keto-etiocholane were dissolved in 10 cc. of a 5% methanol solution of potassium hydroxide and the mixture was heated at reflux for half an hour. By dilution, 17β-hydroxy-3-keto-etiocholane was obtained which, on recrystallization from acetone, showed melting point 154–156° C.; $[\alpha]_D = 5 \pm 1 (CHCl_3)$.

*Example 3*

Two grams of 3,11,20-pregnantrione were suspended in 40 cc. of hot ethanol and treated with a mixture of 6 cc. acetone-cyanohydrin containing two drops of triethylamine. After a few minutes, all the products went in solution. After allowing to stand at room temperature (about 15° C.) for six hours, the reaction mixture was then diluted with water, acidulated with acetic acid and extracted with ether. The ethereal layer after washing with water and drying, left by evaporation an oily residue consisting of 3,11,20-pregnandione 3-monocyanohydrin. One gram of the said monocyanohydrin was dissolved in 10 cc. of chloroformic solution containing 8% of perbenzoic acid and the solution was allowed to stand at 30° C. for 8 days. The chloroform phase was then washed with a sodium bicarbonate solution and evaporated in vacuo. The oily residue was directly saponified at reflux by treatment with sodium carbonate in aqueous methanol for two hours. On dilution, 17β-hydroxy-3,11-diketo-etiocholane separated off. On recrystallization from ethyl acetate the product melted at 163–165° C.; [α]_D = +66±2 (acetone).

What I claim is:

1. A process for the preparation of an androstane of the formula:

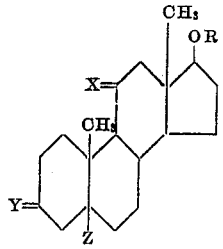

wherein Z is selected from the group consisting of α-hydrogen and β-hydrogen; X is selected from the group consisting of two hydrogen atoms, and ketonic oxygen; Y is selected from the group consisting of an α-cyano group and a β-hydroxy group, a β-cyano group and an α-hydroxy group, and oxygen; and R is selected from the group consisting of hydrogen and the acetyl group which comprises the steps of reacting a 3,20-diketo-pregnane of the formula:

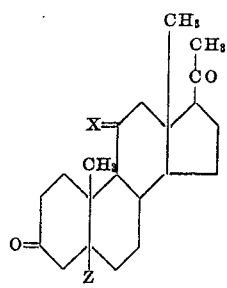

where X and Z have the above assigned meanings, with acetone cyanohydrin in an alcohol solution and in the presence of a basic catalyst, reacting the 3-monocyanohydrin formed, having the formula:

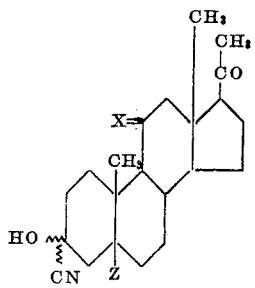

where X and Z have the above assigned meanings, with an oxidizing agent selected from the group consisting of peracetic acid, perbenzoic acid, perphthalic acid and hydrogen peroxide, and recovering said androstane.

2. The process of claim 1 in which the alcohol in the first step is selected from the group consisting of methanol and ethanol.

3. A process for the preparation of a 17-hydroxy-3-keto-steroid having the formula:

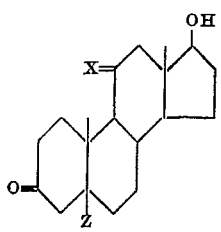

wherein Z is selected from the group consisting of α-hydrogen and β-hydrogen, X is selected from the group consisting of two hydrogen atoms and ketonic oxygen, which comprises reacting a 3,20-diketo-steroid having the formula:

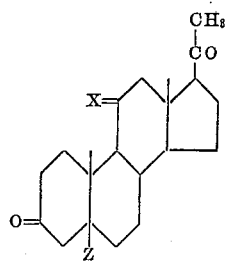

where X and Z have the meanings defined above, with acetone cyanohydrin in an alcohol solution and in the presence of a basic catalyst to form the 3-cyanohydrin of the corresponding 3,20-diketo-steroid, reacting said cyanohydrin product with an oxidizing agent selected from the group consisting of peracetic acid, perbenzoic acid, perphthalic acid and hydrogen peroxide to form the corresponding 3-cyanohydrin of the 3-keto-17-acetoxy compound and hydrolyzing this latter with a base selected from the group consisting of alkaline hydroxide and carbonate to form said 17-hydroxy-3-keto-steroid.

4. A process as claimed in claim 3, in which the alcohol is selected from the group consisting of methanol and ethanol.

5. A process for the preparation of androstan-17-ol-3-one which comprises reacting allopregnane-3,20-dione with acetone cyanohydrin in an alcohol solution and in the presence of a basic catalyst to form the 3-cyanohydrin of allopregnane-3,20-dione, reacting said cyanohydrin product with an oxidizing agent selected from the group consisting of peracetic acid, perbenzoic acid, perphthalic acid and hydrogen peroxide to form the 3-cyanohydrin of the androstan-17-ol-3-one acetate, and hydrolyzing this latter with a base selected from the group consisting of an alkaline hydroxide and carbonate to form androstan-17-ol-3-one.

6. A process as claimed in claim 5, in which the alcohol is selected from the group consisting of methanol and ethanol.

7. A process for the preparation of 17-acetoxy-androstan-3-one which comprises reacting the allopregnane-3,20-dione with acetone cyanohydrin in an alcohol solution and in the presence of a basic catalyst to form the 3-cyanohydrin of the allopregnane-3,20-dione, reacting said cyanohydrin product with an oxidizing agent selected from the group consisting of peracetic acid, perbenzoic acid, perphthalic acid and hydrogen peroxide to form the 3-cyanohydrin of the 17-acetoxy-androstan-3-one, and hydrolyzing this latter with an organic base to form 17-acetoxy-androstan-3-one.

8. A process as claimed in claim 7, in which the alcohol is selected from the group consisting of methanol and ethanol.

9. A 3-hydroxy-3-cyano-20-keto-steroid having the formula:

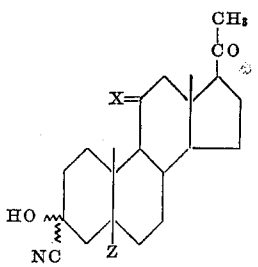

where Z is selected from the group consisting of a α-hydrogen and β-hydrogen, X is selected from the group consisting of two hydrogen atoms and ketonic oxygen.

10. 3ξ-hydroxy-3ξ-cyano-allopregnane-20-one.

References Cited in the file of this patent

UNITED STATES PATENTS 2,935,519    Ercoli _____ May 3, 1960

OTHER REFERENCES

Royals: Advanced Organic Chemistry, Prentice-Hall, Inc., Englewood Cliffs, New Jersey, (1954), pages 668–680.

Rodd: Chemistry of Carbon Compounds, vol. II, part B, Elsevier Publishing Company, New York, (1953), pages 917–918.